United States Patent
Wang et al.

(10) Patent No.: US 7,580,163 B2
(45) Date of Patent: Aug. 25, 2009

(54) SLIP-RESISTANT AND PORTABLE SCANNER

(75) Inventors: Bo-Hsiang Wang, Taiping (TW);
Te-Chuan Hsieh, Kaohsiung (TW)

(73) Assignee: Avision Inc. (TW)

( * ) Notice: Subject to any disclaimer, the term of this patent is extended or adjusted under 35 U.S.C. 154(b) by 970 days.

(21) Appl. No.: 11/003,410

(22) Filed: Dec. 6, 2004

(65) Prior Publication Data

US 2005/0128532 A1    Jun. 16, 2005

(30) Foreign Application Priority Data

Dec. 10, 2003   (TW)   ............................... 92134870 A

(51) Int. Cl.
*H04N 1/04*   (2006.01)
*H04N 1/024*   (2006.01)

(52) U.S. Cl. .................. 358/474; 358/497; 358/473; 358/471; 399/378; 399/380

(58) Field of Classification Search .................. 358/474, 358/471, 400, 497, 401, 472, 473, 505, 501, 358/512–514; 382/181, 313, 312; 399/211, 399/212, 379, 380; 250/239, 234–236
See application file for complete search history.

(56) References Cited

U.S. PATENT DOCUMENTS

| 6,587,231 | B1 * | 7/2003 | Sung ........................... 358/497 |
| 6,825,742 | B1 * | 11/2004 | Luque ......................... 333/204 |
| 7,051,942 | B2 * | 5/2006 | Khovaylo .............. 235/462.43 |
| 2002/0131637 | A1 * | 9/2002 | Hu et al. ..................... 382/181 |

FOREIGN PATENT DOCUMENTS

CN    02206027.8    11/2002

* cited by examiner

*Primary Examiner*—Cheukfan Lee

(57) ABSTRACT

A slip-resistant and portable scanner for scanning a document placed on a document platen includes a housing, a scan window, and a scanning module and a slip-resistant structure. The scan window is mounted on the housing to closely face the document. The scanning module is disposed in the housing to scan the document through the scan window. The slip-resistant structure is disposed on and attached to a surface of the scan window facing the document and in contact with the document or the document platen. Thus, it is possible to prevent the scan window from slipping relatively to the document and enhance the scan quality and convenience.

12 Claims, 3 Drawing Sheets

SLIP-RESISTANT AND PORTABLE SCANNER

BACKGROUND OF THE INVENTION

1. Field of the Invention

The invention relates to a slip-resistant and portable scanner, and more particularly to a slip-resistant and portable scanner capable of conveniently and stably scanning a document placed on a wall.

2. Description of the Related Art

A conventional portable scanner typically has two functions. The first function is to enable a user to place a document on the scanner for scanning the document, while the second function is to enable the user to take the scanner to scan a document, such as a placard, which cannot be easily moved. Thus, the conventional portable scanner can operate under various states, such as a horizontal downward scanning state, a horizontal upward scanning state, and a vertical slant state.

When the user wants to place the conventional portable scanner on the to-be-scanned document placed on the wall, because the surface of the scan window is very smooth, the scanner tends to slip relative to the to-be-scanned document owing to the action of the gravity force or external force interference. In this case, the scan region of the to-be-scanned document fluctuates, and the scan process may fail or the scan quality is poor.

In order to avoid the above-mentioned condition, the user usually has to exert a larger force to push the scanner against the document on the wall more stably. However, when the scanner is scanning the document on the wall in a high-resolution color mode, the scanning time is much longer. So, it is difficult for the user to exert the large force during a long period of time, or the user's arm may ache.

Therefore, it is an important subject of the invention to provide a portable scanner that can be used conveniently.

SUMMARY OF THE INVENTION

It is therefore an object of the invention to provide a slip-resistant and portable scanner capable of effectively preventing the scanner and a document in contact with the wall from slipping relatively to each other, and thus facilitate the user to complete the scan operation easily.

To achieve the above-mentioned object, the invention provides a slip-resistant and portable scanner for scanning a document placed on a document platen. The scanner includes a housing, a scan window, a scanning module and a slip-resistant structure. The scan window is mounted on the housing to closely face the document. The scanning module is disposed in the housing to scan the document through the scan window. The slip-resistant structure is disposed on and attached to a surface of the scan window facing the document and in contact with the document or document platen. Thus, it is possible to prevent the scan window from slipping relatively to the document, and to enhance the scan quality and convenience.

The above-mentioned slip-resistant structure may be a ring-shaped slip-resistant stick or an L-shaped slip-resistant stick for defining a maximum scan region and providing a reference point or reference corner for document scanning.

DETAILED DESCRIPTION OF THE INVENTION

Figure 1:
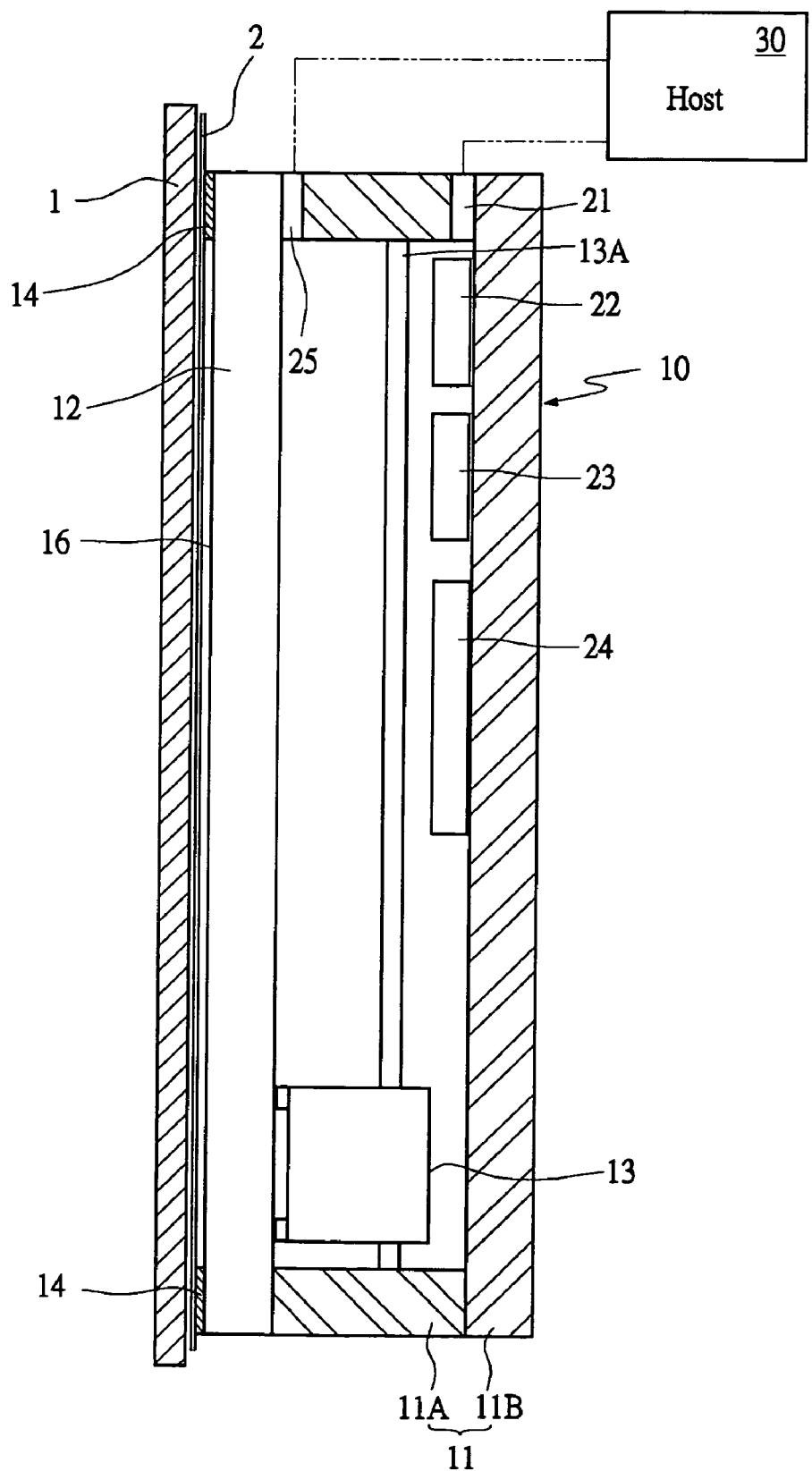
FIG. 1 is a schematic illustration showing a slip-resistant and portable scanner for scanning a document on the wall according to a first embodiment of the invention.

FIG. 1 is a schematic illustration showing a slip-resistant and portable scanner for scanning a document on the wall according to a first embodiment of the invention. As shown in FIG. 1, the slip-resistant and portable scanner 10 of this embodiment is for scanning a document 2 placed on a document platen 1. The document platen 1 may be a wall, a floor, or the like. The document 2 may be a placard placed on the document platen 1, or a pattern depicted on the document platen 1. The reason why the user pushes the slip-resistant and portable scanner 10 against the document platen 1 is because the document platen 1 is usually fixed or cannot be easily moved.

The slip-resistant and portable scanner 10 includes a housing 11, a scan window 12, a scanning module 13 and a slip-resistant structure 14. The scan window 12 is mounted on the housing 11 to closely face the document 2. The scanning module 13 is disposed in the housing 11 to scan the document 2 through the scan window 12. The scanning module 13 is preferably capable of sliding under the scan window 12 along a guiding rod 13A and in contact with the scan window 12 so as to keep the distance between the module 13 and the document 2 constant. The slip-resistant structure 14 is disposed on and attached to a surface of the scan window 12 facing the document 2 and in contact with the document 2 or document platen 1. Thus, it is possible to prevent the scan window 12 from slipping relatively to the document 2. Specifically speaking, when the to-be-scanned region of the document 2 is smaller than a maximum scan region 16 of the slip-resistant and portable scanner 10, the slip-resistant structure 14 contacts the document platen 1. When the to-be-scanned region of the document 2 is larger than the maximum scan region 16 of the slip-resistant and portable scanner 10, the slip-resistant structure 14 contacts the document 2. Alternatively, according to the selected scan range, it is possible to make the slip-resistant structure 14 contact both the document 2 and the document platen 1.

The slip-resistant structure 14 includes a slip-resistant material disposed on a part of the scan window 12 and usually around the scan window 12. Alternatively, the slip-resistant material may be applied on or adhered to the scan window 12 by way of coating, adhering, or the like.

The slip-resistant and portable scanner 10 of this embodiment may further selectively include at least one of the following members of: a USB (Universal Serial Bus) connection port 21, a power management unit 22, a battery 23, a remote transceiver 24 and a memory device 25. The USB connection port 21 is connected to a host 30 through a signal line. The power management unit 22 connected to the USB connection port 21 receives and manages a host power, which comes from the host 30, for the operation of the slip-resistant and portable scanner. The above-mentioned architecture may make the user feel inconvenient when he or she is using the scanner due to the limitation of the signal line. Thus, the battery 23 may be adopted to provide a battery power for the operation of the slip-resistant and portable scanner. The battery 23 also may be charged by receiving the host power coming from the USB connection port 21. The signal line, which is provided for the purpose of transmission of the scan signal, may also influence the convenience of using the scanner. So, the remote transceiver 24 may be adopted to be signal-connected to the host 30 in a wireless manner so that an image signal, which is obtained when the scanning module 13 is scanning the document 2, can be transmitted to the host 30. Alternatively, the memory device 25 also may be adopted to store the image signal obtained when the scanning module 13 is scanning the document 2. The memory device 25 may be a memory card similar to that in a digital camera, or a portable hard disk having a USB interface.

The housing 11 includes a transparent bottom 11B facing the scan window 12 and a hollow frame 11A. The hollow frame 11A and the transparent bottom 11B may be independent members or formed into a one-piece member. The transparent bottom 11B helps the user to quickly find a scan reference point before the document on the wall is scanned.

Figure 2:
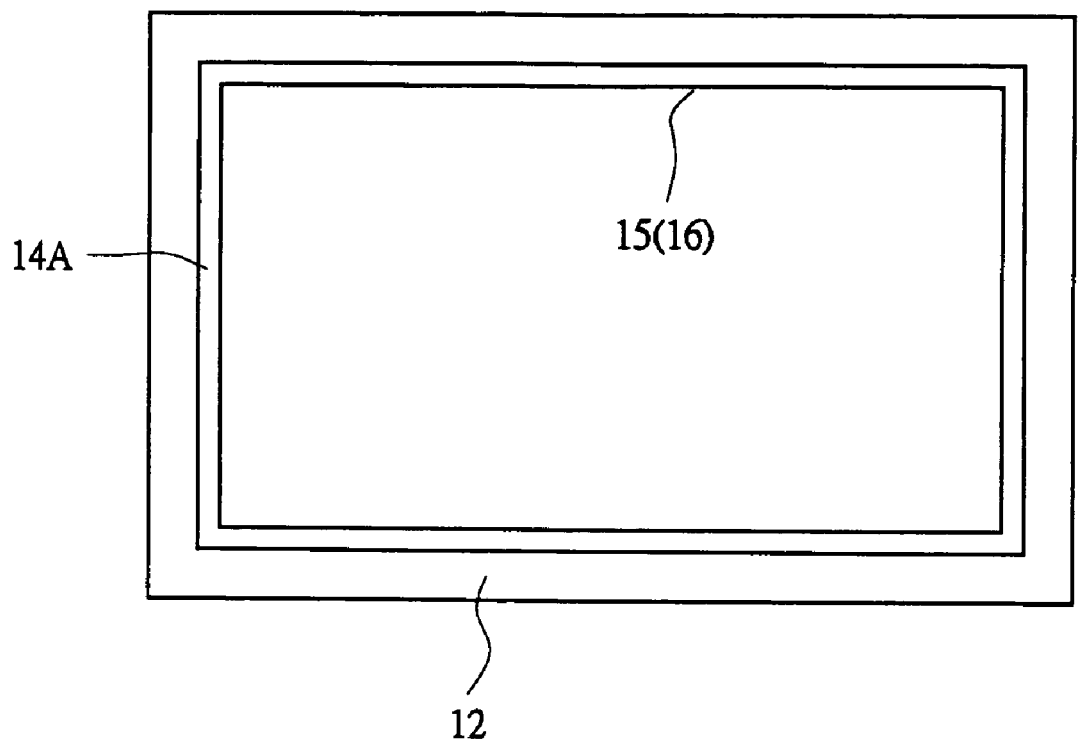
FIG. 2 is a schematic top view showing a slip-resistant and portable scanner according to a second embodiment of the invention.
Figure 3:
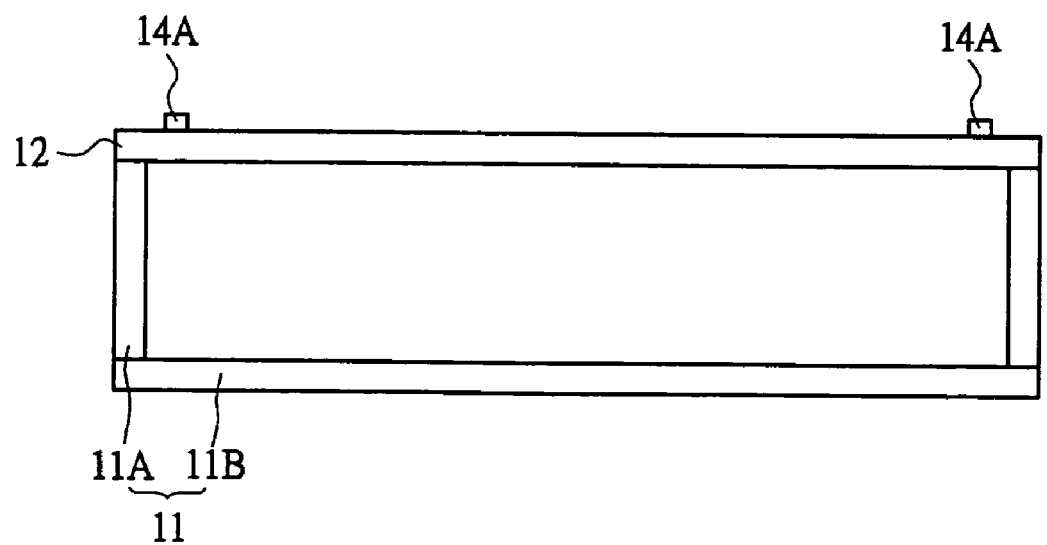
FIG. 3 is a schematic side view showing the slip-resistant and portable scanner according to the second embodiment of the invention.

Referring to FIGS. 2 and 3, the slip-resistant structure 14 of the slip-resistant and portable scanner according to a second embodiment of the invention includes a slip-resistant stick 14A, which surrounds and defines a rectangular region 15. The rectangular region 15 corresponds to a maximum scan region 16 of the slip-resistant and portable scanner 10. Thus, the slip-resistant stick 14A can provide a boundary for aligning the document. The slip-resistant stick 14A may be, for example, made of a rubber material, which may be directly adhered onto the scan window 12.

Figure 4:
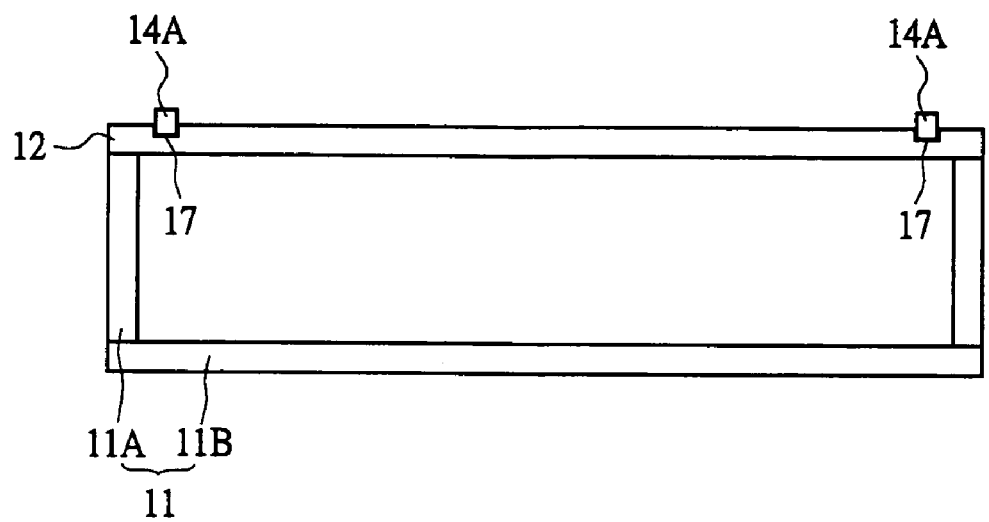
FIG. 4 is a schematic side view showing a slip-resistant and portable scanner according to a third embodiment of the invention.

As shown in FIG. 4, the slip-resistant stick 14A of the slip-resistant and portable scanner according to a third embodiment of the invention also may be disposed in a ring-shaped groove 17 of the scan window 12 and slightly project over the scan window 12.

Figure 5:
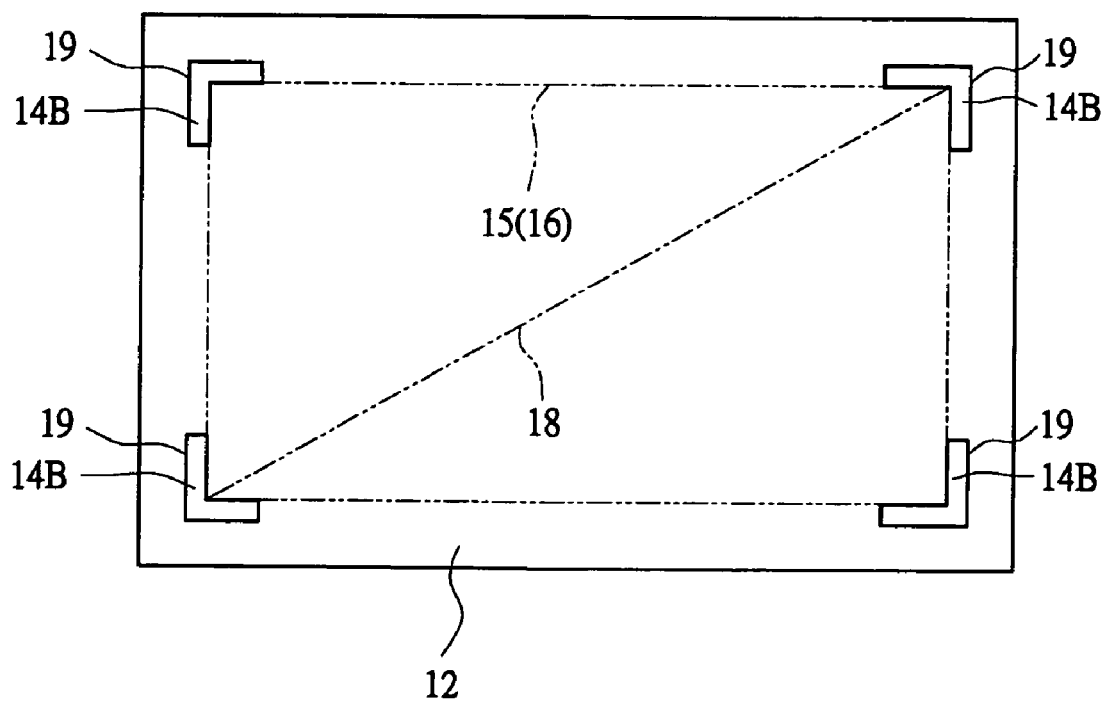
FIG. 5 is a schematic top view showing a slip-resistant and portable scanner according to a fourth embodiment of the invention.

Referring to FIG. 5, the slip-resistant structure 14 of the slip-resistant and portable scanner according to a fourth embodiment of the invention includes four slip-resistant sticks 14B. In practice, only one or two slip-resistant sticks can implement the invention. These slip-resistant sticks 14B have L-shapes and define a maximum scan region 16 of the slip-resistant and portable scanner 10. Consequently, corners for aligning the document also may be provided. These slip-resistant sticks 14B are located at four corners of the maximum scan region 16, so two of the slip-resistant sticks 14B are located at a diagonal 18 of the maximum scan region 16. Each slip-resistant stick 14B also may be directly adhered to the scan window 12, or disposed in an L-shaped groove 19 of the scan window 12. It is to be noted that in addition to the slip-resistant stick 14A surrounding a rectangular and the L-shaped slip-resistant stick 14B, the slip-resistant structure 14 may also include a plurality of dot-like slip-resistant blocks or at least one straight slip-resistant stick.

According to the above-mentioned design of the invention, the user can easily take this scanner to scan the document on the wall. The stable static state between the scanner and the document can be maintained without exerting the force too laboriously during the scanning process. The slip-resistant structure disposed on the scan window can prevent the scanner and the document from slipping relatively to each other, and can further provide a reference point or region to facilitate the scanning of the document such that the scanning operation can be precisely achieved. In addition, when the scanner of the invention is scanning the document on the floor, the user can also directly place the scanner on the document. The weight of the scanner itself can provide a normal force between the slip-resistant structure and the document so that a sufficient friction force can be provided to prevent the scanner from vibrating and thus prevent the scanner and the document from slipping relatively to each other due to the vibration.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A slip-resistant and portable scanner for scanning a document placed on a document platen, the scanner comprising:
   a housing;
   a scan window mounted on the housing to closely face the document;
   a scanning module disposed in the housing to scan the document through the scan window; and
   a slip-resistant structure disposed on and attached to a surface of the scan window facing the document and in contact with the document or the document platen, so as to prevent the scan window from slipping relatively to the document, wherein the slip-resistant structure comprises a slip-resistant stick surrounding and defining a rectangular region, and the slip-resistant stick is disposed in a ring-shaped groove of the scan window.

2. The scanner according to claim 1, wherein the housing comprises a transparent bottom facing the scan window.

3. The scanner according to claim 1, wherein the rectangular region corresponds to a maximum scan region of the slip-resistant and portable scanner.

4. A slip-resistant and portable scanner for scanning a document placed on a document platen, the scanner comprising:
   a housing;
   a scan window mounted on the housing to closely face the document;
   a scanning module disposed in the housing to scan the document through the scan window; and
   a slip-resistant structure disposed on and attached to a surface of the scan window facing the document and in contact with the document or the document platen, so as to prevent the scan window from slipping relatively to the document, wherein the slip-resistant structure comprises two slip-resistant sticks, and each of the slip-resistant sticks is disposed in an L-shaped groove of the scan window.

5. The scanner according to claim 4, further comprising:
   a USB connection port to be connected to a host; and
   a power management unit connected to the USB connection port to receive and manage a host power, which comes from the host, for an operation of the slip-resistant and portable scanner.

6. The scanner according to claim 4, further comprising:
   a battery for supplying a battery power for an operation of the slip-resistant and portable scanner.

7. The scanner according to claim 4, further comprising:
   a remote transceiver, which is signal-connected to a host in a wireless manner and for transmitting an image signal, which is obtained when the scanning module scans the document, to the host.

8. The scanner according to claim 4, further comprising:

a memory device for storing an image signal obtained when the scanning module scans the document.

9. The scanner according to claim 4, wherein the scanning module contacts the scan window and slides under the scan window.

10. The scanner according to claim 4, wherein each of the slip-resistant sticks is L-shaped and the slip-resistant sticks define a maximum scan region of the slip-resistant and portable scanner.

11. The scanner according to claim 10, wherein the slip-resistant sticks are located on a diagonal of the maximum scan region.

12. The scanner according to claim 10, wherein the housing comprises a transparent bottom facing the scan window.

* * * * *